United States Patent [19]
Yamada et al.

[11] Patent Number: 6,136,758
[45] Date of Patent: Oct. 24, 2000

[54] ALUMINUM NITRIDE POWDER AND THERMALLY CONDUCTIVE GREASE COMPOSITION USING THE SAME

[75] Inventors: Kunihiro Yamada; Takayuki Takahashi; Kenichi Isobe, all of Gunma-ken, Japan

[73] Assignee: Shin-Etsu Chemical Co., Ltd., Japan

[21] Appl. No.: 09/209,455

[22] Filed: Dec. 11, 1998

[30] Foreign Application Priority Data

Aug. 17, 1998 [JP] Japan ................... 10-230587
Aug. 18, 1998 [JP] Japan ................... 10-232074

[51] Int. Cl.$^7$ .............. C10M 107/50; C10M 169/02
[52] U.S. Cl. .................. 508/172; 508/173; 508/208
[58] Field of Search ................... 508/172, 173, 508/208

[56] References Cited

U.S. PATENT DOCUMENTS

| | | | |
|---|---|---|---|
| 5,100,568 | 3/1992 | Takahashi et al. | 508/172 |
| 5,227,081 | 7/1993 | Sawa et al. | 508/172 |

FOREIGN PATENT DOCUMENTS

| | | |
|---|---|---|
| 0 939 115 | 9/1999 | European Pat. Off. . |
| 52125506 | 10/1977 | Japan . |
| 02153995 | 6/1990 | Japan . |
| 4321506 | 4/1991 | Japan . |
| 4321576 | 4/1991 | Japan . |
| 06209057 | 7/1994 | Japan . |

OTHER PUBLICATIONS

Patent Abstracts of Japan, vol. 017, No. 158 (1993): JP 04 321506 (Matsushita Electric Works, Ltd.) Month unavailable.

*Primary Examiner*—Jacqueline V. Howard
*Attorney, Agent, or Firm*—Millen, White, Zelano & Branigan, P.C.

[57] ABSTRACT

An aluminum nitride powder having the surface treated with an organosilane represented by formula, $R^I_a R^{II}_b SiY_{4-1-b}$, and/or a partial hydrolysis condensate thereof to acquire excellent moisture-proof, wherein $R^I$ represents a 6–20C alkyl group or a group formed by substituting halogen atom or atoms for part or all of the hydrogen atoms attached to carbon atoms of the 6–20C alkyl group, $R^{II}$ represents a 1–20C hydrocarbon group or a group formed by substituting halogen atom or atoms for part or all of the hydrogen atoms attached to carbon atoms of the 1–20C hydrocarbon group, Y represents a hydrolyzable group, a is an integer of 1 to 3 and b is an integer of 0 to 2, provided that a+b is an integer of 1 to 3; and a thermally conductive grease composition comprising (A) 50–95 weight % of the aforementioned surface-treated aluminum nitride powder and (B) 5 to 50 weight % of at least one base oil selected from the group consisting of liquid silicones, liquid hydrocarbons and fluorohydrocarbon oils, and further, if desired, (C) 0–30 weight % of a thicknener selected from the group consisting of zinc oxide, alumina, boron nitride and silicon carbide powders.

20 Claims, No Drawings

ALUMINUM NITRIDE POWDER AND THERMALLY CONDUCTIVE GREASE COMPOSITION USING THE SAME

FIELD OF THE INVENTION

The present invention relates to an aluminum nitride powder and a thermally conductive grease composition using such a powder. Specifically, the invention concerns an aluminum nitride powder which has improved water resistance and can function effectively as a heat reducing material when filled into grease or the like, and further to a thermally conductive grease composition which utilizes the aforesaid aluminum nitride powder to ensure high water resistance therein and acquire thermal conductivity adequate for the heat reduction of electronic devices.

BACKGROUND OF THE INVENTION

Most of electronic devices generate heat while they are used, so that the removal of the generated heat therefrom is necessary for their normal operation. For the reduction of the heat from electronic devices, it has been expected to make good use of aluminum nitride having high thermal conductivity and excellent electric insulating properties. In applying it to electronic devices, the aluminum nitride can be used in various forms, including moldings and fillers for grease and synthetic rubber.

However, aluminum nitride is inferior in water resistance, particularly in a pulverized state. More specifically, the aluminum nitride in pulverized state is gradually decomposed while it is allowed to stand in the air, thereby evolving ammonia to be converted into aluminum hydroxide. Therefore, the problem confronting the use of an aluminum nitride powder, e.g., as a filler for heat reduction of resins is poor water resistance of the powder.

For improving the water resistance of an aluminum nitride powder, some attempts have been made. For instance, the improvement of water resistance has been attempted by coating the surface of an aluminum nitride powder with an organic high molecular compound, or by oxidizing the aluminum nitride powder surface to form a protective film of aluminum oxide. Further, Japanese Tokkai Hei 4-321506 (the term "Tokkai" as used herein means an "unexamined published patent application") proposes the art of forming a coating on the aluminum nitride powder surface through the reaction between an organosilane oligomer and an silanol group-containing polyorganosiloxane in the presence of a catalyst.

However, none of those methods are successful in conferring sufficient water resistance upon aluminum nitride. Thus, the application of such aluminum nitride powders to a silicone grease composition for heat reduction use has a defect that the resulting composition suffers gradual deterioration in heat reduction characteristics.

SUMMARY OF THE INVENTION

As a result of our intensive studies to improve the water resistance of an aluminum nitride powder, it has been found that an aluminum nitride powder having high water resistance can be obtained by the surface treatment of aluminum nitride with a specified organosilane and/or partial hydrolysis condensate thereof, thereby achieving the present invention.

Therefore, a first object of the present invention is to provide an aluminum nitride powder which has high water resistance and is effectively used as a filler to constitute a heat reducing material.

A second object of the present invention is to provide a grease composition for heat reduction use which shows high resistance to water although an aluminum nitride powder is used therein as a filler.

The above-described objects of the present invention are attained with an aluminum nitride powder having the surface treated with an organosilane represented by formula, $R^I_a R^{II}_b SiY_{4-1-b}$, and/or a partial hydrolysis condensate thereof, wherein $R^I$ represents a 6–20C alkyl group or a group formed by substituting halogen atom or atoms for part or all of the hydrogen atoms attached to carbon atoms of the 6–20C alkyl group, $R^{II}$ represents a 1–20C hydrocarbon group or a group formed by substituting halogen atom or atoms for part or all of the hydrogen atoms attached to carbon atoms of the 1–20C hydrocarbon group, Y represents a hydrolyzable group, a is an integer of 1 to 3 and b is an integer of 0 to 2, provided that a+b is an integer of 1 to 3; and with a thermally conductive grease composition comprising (A) 50–95 weight % of an aluminum nitride powder the surface of which is treated with an organosilane represented by formula, $R^I_a R^{II}_b SiY_{4-1-b}$, and/or a partial hydrolysis condensate thereof, and (B) 5 to 50 weight % of at least one base oil selected from the group consisting of liquid silicones, liquid hydrocarbons and fluorohydrocarbon oils, wherein $R^I$ represents a 6–20C alkyl group or a group formed by substituting halogen atom or atoms for part or all of the hydrogen atoms attached to carbon atoms of the 6–20C alkyl group, $R^{II}$ represents a 1–20C hydrocarbon group or a group formed by substituting halogen atom or atoms for part or all of the hydrogen atoms attached to carbon atoms of the 1–20C hydrocarbon group, Y represents a hydrolyzable group, a is an integer of 1 to 3 and b is an integer of 0 to 2, provided that a+b is an integer of 1 to 3.

DETAILED DESCRIPTION OF THE INVENTION

The organosilane with which an aluminum nitride powder undergoes surface treatment to function as Component (A) of the present grease composition is represented by formula $R^I_a R^{II}_b SiY_{4-a-b}$. $R^I$ in the formula represents a 6–20C alkyl group, with examples including hexyl, octyl, decyl, dodecyl, tetradecyl, hexadecyl and octadecyl groups. And the hydrogen atoms of such alkyl groups may be partly or all replaced by hydrogen atoms. Of these alkyl groups, 6–14 C alkyl groups are preferred over the others. The number of $R^I$ group(s), which is represented by "a", is 1, 2 or 3, preferably 1.

$R^{II}$ in the formula represents a 1–20C hydrocarbon group, which includes an alkyl group, a cycloalkyl group, an alkenyl group, an aryl group and an aralkyl group. And the hydrogen atoms of such groups may be partly or all replaced by hydrogen atoms. Examples of a hydrocarbon group represented by $R^{II}$ include alkyl groups, such as methyl, ethyl, propyl, butyl, pentyl, hexyl, octyl, decyl, dodecyl, tetradecyl, hexadecyl and octadecyl; cycloalkyl groups, such as cyclopentyl and cyclohexyl; alkenyl groups, such as vinyl and allyl; aryl groups, such as phenyl and tolyl; aralkyl groups, such as 2-phenylethyl and 2-methyl-2-phenylethyl; and halogenated hydrocarbon groups, such as 3,3,3-trifluoropropyl, 2-(perfluorobutyl)ethyl, 2-(perfluorooctyl)ethyl and p-chlorophenyl. Of these groups, methyl group is especially preferred.

The hydrolyzable group represented by Y is a functional group selected from the class consisting of a hydroxyl group, 1–6C alkoxy groups, acyloxy groups and alkenyloxy groups. Examples of such a hydrolyzable group include a methoxy group, an ethoxy group, a propoxy group, a butoxy group, an acetoxy group and a propenoxy group. Of these groups, hydroxyl and alkoxy groups are especially preferred over the others.

Specific examples of an organosilane represented by the foregoing formula include $C_6H_{13}Si(OCH_3)_3$, $C_{10}H_{21}Si(OCH_3)_3$, $C_{12}H_{25}Si(OCH_3)_3$, $C_{16}H_{33}Si(OCH_3)_3$, $C_{10}H_{21}Si(CH_3)(OCH_3)_2$, $C_{10}H_{21}Si(C_6H_5)(OCH_3)_2$, $C_6H_{13}Si(COCH_3)_3$, $C_{10}H_{21}Si(CH_3)(COCH_3)_2$, $C_6H_{13}Si(CH_2CH_2C_6H_5)(OH)_2$, $C_6H_{13}Si(OH)_3$, $C_{10}H_{21}Si(CH=CH_2)(OCH_3)_2$, $C_{10}H_{21}Si(CH_2CH_2CF_3)(OCH_3)_2$, $C_4F_9CH_2CH_2Si(OH)_3$, $(C_4F_9CH_2CH_2)_2Si(OCH_3)_2$, $C_8F_{17}Si(OCH_3)_3$ and $C_8F_{17}Si(COC_2H_5)_3$.

The suitable amount of an organosilane used is from 0.1 to 30 parts by weight, preferably from 0.5 to 10 parts by weight, per 100 parts by weight of aluminum nitride powder. When the amount of an organosilane used is less than 0.1 parts by weight, the aluminum nitride powder treated therewith is poor in water resistance; while, even when the amount is increased beyond 30 parts by weight, no increase in treatment effect is attained, so it means a waste of organosilane.

When the proportion of the aluminum nitride powder having the organosilane-treated surface in a grease composition is less than 50 weight %, the resulting composition is inferior in heat reducing characteristics; while, when it is more than 95 weight %, the grease obtained is poor in spreadability. Accordingly, the appropriate proportion of the surface-treated aluminum nitride powder as Component (A) is from 50 to 95 weight %, preferably from 60 to 80 weight %.

The aluminum nitride powder used in the present invention is a nitride of Group III–V metal which generally has a crystal structure of hexagonal system or wurtzite type, and colored white or grayish white in appearance. The particle shape of the aluminum nitride powder is amorphous or spherical depending on the preparation method adopted.

The aluminum nitride powder to undergo the present surface treatment is prepared using, e.g., a direct nitriding method in which a metallic aluminum powder is allowed to react directly with nitrogen or ammonia, an alumina reduction method in which a mixture of alumina and carbon powders is heated in an atmosphere of nitrogen or ammonia to undergo reduction and nitriding reactions at the same time, a method of reacting aluminum vapor directly with nitrogen, or the pyrolysis of $AlCl_3 \cdot NH_3$.

The aluminum nitride powders prepared according to any of the methods as mentioned above can be used in the present invention, although they differ in characteristics, including the chemical composition (impurities), the particle shape and the particle size distribution, depending on the preparation method adopted. Also, the powders prepared by different methods may be used as a mixture.

The thus prepared aluminum nitride powder is a very hard material, and has an excellent thermal conductivity, electric insulation and mechanical strength.

Any aluminum nitride powder is usable in the present invention as far as the Mohs' hardness thereof is in the range of 7 to 9. In particular, aluminum nitride powders having Mohs' hardness of from 8 to 9 are used to advantage.

With respect to the average particle size thereof, the aluminum nitride powder having an average particle size in a wide range of 0.1 to 100 μm is usable in the present invention. In view of dispersibility in a base oil as Component (B), however, it is desirable for the aluminum nitride powder to have an average particle size in the range of 0.5 to 5 μm, preferably 1 to 4 μm, particularly preferably 2 to 4 μm.

This is because the grease obtained using an aluminum nitride powder having an average particle size smaller than 0.5 μm is low in consistency (or high hardness and poor dispensation suitability); while, when the average particle size is larger than 5 μm, the thermally conductive material obtained is poor in uniformity and stability and, what is worse, the base oil separates therefrom to a considerable extent (namely, the material obtained has a high oil-separation degree). Therefore, it is a matter of course that good grease cannot be obtained in the foregoing cases.

With respect to the specific surface area, the aluminum nitride powders as mentioned above are usable as far as their specific surface area is in the range of 0.1 to 100 m²/g. In order to obtain a uniform grease composition, however, it is desirable that the specific surface area of an aluminum nitride powder used be in the range of 1 to 10 m²/g, particularly 2 to 5 m²/g.

The thermal conductivity of aluminum nitride is $7.7 \times 10^{-1}$ cal/cm·sec·° C. in theory, but the actually measured value is lower than the theoretical value, specifically $6.0 \times 10^{-1}$ cal/cm·sec·° C. or below, because the aluminum nitride powder obtained in practice is more or less contaminated with impurities and contains voids and bubbles. It is required for the aluminum nitride powder used in the present invention to have a thermal conductivity of at least $1.5 \times 10^{-1}$ cal/cm·sec·° C. at room temperature. In particular, it is desirable that the thermal conductivity thereof be at least $2.4 \times 10^{-1}$ cal/cm·sec·° C. at room temperature. When the thermal conductivity of an aluminum nitride powder used is below $1.5 \times 10^{-1}$ cal/cm·sec·° C., the thermal conductivity of the grease obtained cannot reach such a high value as to be aimed at by the present invention.

Examples of aluminum nitride which can be used in the present invention include US, UF and UM, trade names, produced by Toyo Aluminum Co., Ltd., XUS-55548, trade name, produced by Dow Chemical Co., Ltd., H-grade and F-grade, trade names, produced by K.K. Tokuyama, FA and ES-10, trade names, produced by Nippon Light Metal Co., Ltd., and A-100WR, A-100 and AG-SD, trade names, produced by Advanced Refractory Technologies Inc.

The surface treatment of an aluminum nitride powder in the present invention can be effected in a conventional way, e.g., by mixing an aluminum nitride powder and an organosilane or partial hydrolysis products thereof by means of a mixing machine, such as TRIMIX, TWINMIX or PLANETARY MIXER (trade names, products of INOUE MFG., INC.), ULTRA MIXER (trade name, a product of MIZUHO INDUSTRIAL CO., LTD.) or HIVISDISPERMIX (trade name, a product of TOKUSHU KIKA KOGYO CO., LTD.).

Therein, the mixing may be carried out while heating those materials up to 50–150° C., if needed. Further, the mixing may be performed in the presence of a diluent, such as toluene, xylene, petroleum ether, mineral spirit, isoparaffin, isopropyl alcohol or ethanol. In this case, it is desirable that the diluent be removed with a vacuum device or the like at the conclusion of mixing.

The aluminum nitride powder treated in accordance with the present invention has great improvement in water resisting properties, and thereby the generation of ammonia due to the hydrolysis thereof can be inhibited. Thus, the present aluminum nitride powder not only has high thermal conductivity but also can be used under high humidity, so that it is well suited to the filler of a heat reducing material.

Since the present thermally conductive grease composition comprises (A) 50–95 weight % of the surface-treated aluminum nitride powder and (B) 5–50 weigh % of a base oil, the diluent used at the mixing time in the foregoing surface treatment can also be the base oil as Component (B) of the present composition. In this case, the organosilane or partial hydrolysis products thereof as the treating agent is mixed in advance with a base oil, and then admixed with an aluminum nitride powder to effect the mixing and the surface treatment at the same time. The composition prepared in this manner is also included in the present invention.

The liquid silicone used as the base oil of Component (B) in the present grease composition can be properly selected from known silicones which are liquid at room temperature, such as organopolysiloxanes, polyorganosilalkylenes, polyorganosilanes and copolymers thereof. From the viewpoint of ensuring heat resistance, stability and electric insulation, however, it is desirable to use organopolysiloxanes, particularly an organopolysiloxane represented by compositional formula $R^{III}_c SiO_{(4-c)/2}$. Each $R^{III}$ in this formula is a group selected from monovalent saturated or unsaturated, unsubstituted or substituted, hydrocarbon groups having 1 to 30 carbon atoms, and all $R^{III}$ groups may be the same or different.

Examples of such a hydrocarbon group as $R^{III}$ include alkyl groups (e.g., methyl, ethyl, propyl, butyl, pentyl, hexyl, octyl, decyl, dodecyl, tetradecyl, hexadecyl and octadecyl), cycloalkyl groups (e.g., cyclopentyl and cyclohexyl), alkenyl groups (e.g., vinyl and allyl), aryl groups (e.g., phenyl and tolyl), groups formed by substituting halogen atom(s), cyano group(s) or/and hydroxyl group(s) for part or all of the hydrogen atoms attached to carbon atoms present in the above-recited groups (e.g., chloromethyl, 3,3,3-trifluoropropyl, 2-(perfluorobutyl)ethyl, 2-(perfluorooctyl)ethyl, p-chlorophenyl, cyanopropyl, phenol and hindered phenol), and functional group-containing hydrocarbon groups (e.g., amino group-containing hydrocarbon groups, polyether group-containing hydrocarbon groups and epoxy group-containing hydrocarbon groups). Of these groups, a methyl group, a phenyl and alkyl groups having 6 to 14 carbon atoms are preferred over the others.

In view of consistency required for the grease composition, it is desirable that "c" in the above formula be a number of 1.8–2.3, preferably 1.9–2.1. Further, it is desirable that the viscosity of the foregoing organopolysiloxane be from 50 to 500,000 cs, particularly from 100 to 10,000 cs, at 25° C. When the viscosity is below 50 cs at 25° C., the grease obtained shows a strong tendency to oil bleeding; while, when it is above 500,000 cs at 25° C., the grease prepared is poor in spreadability.

The organopolysiloxane used in the present invention can have any of linear, branched and cyclic structures. In addition, it is not necessarily a single compound, but it can be a mixture of two or more different organopolysiloxanes. Although "c" is a number of from 1.8 to 2.3, it is desirable for the organopolysiloxane to have "c" in the range of 1.9 to 2.1, because this range enables the organopolysiloxane to have a linear structure or a structure close thereto.

Suitable examples of such an organopolysiloxane include dimethylpolysiloxane, diethylpolysiloxane, methylphenylpolysiloxane, dimethylsiloxane-diphenylsiloxane copolymer, and alkyl-modified methylpolysiloxanes. Of these polysiloxanes, homopolymers and copolymers produced from dimethylsiloxane, alkylmethylsiloxane, methylphenylsiloxane or/and diphenylsiloxane and blocked at their molecular-chain ends with trimethylsilyl or dimethylhydrosilyl groups are preferred in particular.

More specifically, such organopolysiloxanes are represented by, e.g., the following formula (I):

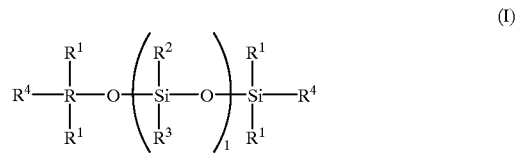

(I)

wherein each of $R^1$ groups is a group selected from monovalent unsubstituted or substituted hydrocarbon groups having 1 to 30 carbon atoms, such as alkyl groups (e.g., methyl, ethyl, propyl, butyl, amyl and octyl), alkenyl groups (e.g., vinyl, and allyl), aryl groups (e.g., phenyl and tolyl) and groups formed by substituting halogen atom(s), cyano group(s) or hydroxyl group(s) for part or all of the hydrogen atoms attached to carbon atoms present in the above-recited groups (e.g., chloromethyl, 3,3,3-trifluoropropyl, cyanopropyl, phenol and hindered phenol); $R^2$ and $R^3$ groups are the same or different, and each of them is the same monovalent hydrocarbon group as $R^1$ represents, an amino group-containing organic group, a polyether group-containing organic group or an epoxy group-containing organic group; $R^4$ is a hydrogen atom, the same monovalent hydrocarbon group as $R^1$ represents, the same monovalent organic group as $R^2$ or $R^3$ represents, or a hydroxyl group; and l is a positive number to ensure the viscosity of from 50 to 500,000 cs at 25° C. in the organopolysiloxane.

It is desirable for the organopolysiloxane used in the present invention to be blocked with trimethylsilyl groups at the molecular-chain ends thereof. As $R^1$, $R^2$ and $R^3$ each, an alkyl group such as methyl or ethyl, an aryl group such as phenyl or tolyl, or a group formed by substituting hydroxyl group(s) for a part of the hydrogen atoms of the group as recited above, particularly a methyl group, a phenyl group or an alkyl group having 6 to 14 carbon atoms, is preferable with respect to easiness of synthesis and thermal resistance and electric insulation of the oil obtained.

The organopolysiloxane oil as mentioned above can be produced in accordance with known methods. For instance, dimethylpolysiloxane oil can be produced by subjecting a low molecular cyclic siloxane, such as octamethylcyclotetrasiloxane or decamethylcyclopentasiloxane, to a ring-opening reaction in the presence of an acid catalyst, such as sulfuric acid, chlorosulfonic acid, nitric acid, phosphoric acid, activated clay, acid clay or trifluoroacetic acid, or an alkaline catalyst, such as potassium hydroxide, sodium hydroxide, rubidium hydroxide, cesium hydroxide, potassium oxide, potassium acetate or calcium silanolate, and then polymerizing the reaction products In order to produce a dimethylpolysiloxane oil having the intended viscosity by controlling the polymerization degree in the foregoing method, a low molecular weight siloxane having a terminal blocking group, such as hexamethyldisiloxane, octamethyltrisiloxane or decamethyltetrasiloxane, can be added properly at the polymerization stage.

As for the production of organopolysiloxanes having carbon functional groups, on the other hand, an amino group-containing organopolysiloxane can be produced by the dealcoholating condensation reaction between an organopolysiloxane having at least one silanol group and an amino group-containing alkoxysilane, and an epoxy group- or polyether group-containing organopolysiloxane can be produced by subjecting a compound having both epoxy or polyether group and an unsaturated group, such as vinyl group, and an organohydrogenpolysiloxane having hydrogen-attached silicon atom(s) to an addition reaction in the presence of a platinum catalyst.

From the standpoint of improving, e.g., the thermal resistance, $R^1$ in formula (I) may be a monovalent substituted hydrocarbon group having the hindered phenol structure as described in Japanese Tokko Hei 3-131692.

Examples of a liquid silicone suitable for the present invention include those represented by the following formula (II), but these examples should not be construed as limiting on the scope of the present invention anyway:

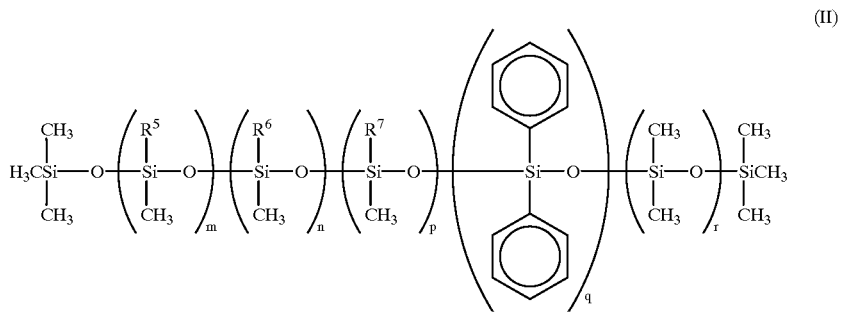

wherein $R_5$ is $—C_4H_9$, $—C_6H_{13}$, $—C_8H_{17}$, $—C_{10}H_{21}$, $—C_{12}H_{25}$, $—C_{15}H_{31}$ or $—C_{18}H_{37}$; $R^6$ is $—(CH_2)_s—Q$; s is an integer of 1 to 6; Q is a group selected from the following monovalent hydrocarbon groups having hindered phenol structures,

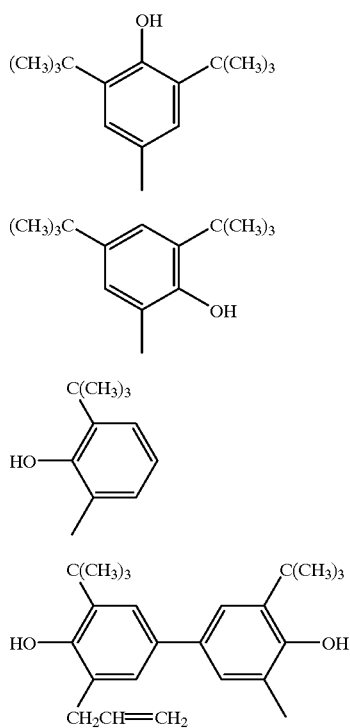

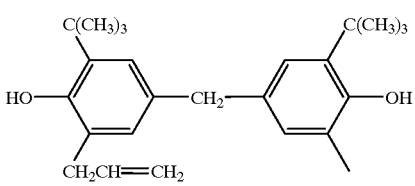

$R^7$ is a 2-phenylethyl group or a 2-phenylpropyl group; and m, n, p, q and r are each a number satisfying the following equations: $0 \leq m \leq 1,000$, $0 \leq n \leq 100$, $0 \leq p \leq 1,000$, $0 \leq q \leq 1,000$, $0 \leq r \leq 2,000$ and $5 \leq m+n+p+q+r \leq 2,000$.

However, the organopolysiloxane oils produced in accordance with the foregoing methods generally contain low molecular weight siloxanes having at most 12 siloxane units in a proportion of about 10%, because they are obtained as equilibrated mixtures of polysiloxanes produced with the progress of polymerization which are various in their polymerization degrees.

After the syntheses using the foregoing methods, therefore, the products obtained generally undergo a stripping treatment at a temperature of 120–250° C. under a reduced pressure to remove the low molecular weight siloxanes therefrom. Even after the stripping treatment, however, the low molecular weight siloxanes still remain in a quantity of 500–20,000 ppm. These low molecular weight siloxanes have a strong adsorbing power, compared with nonpolar combustible gases, so that their vapors are adsorbed strongly by various electrical contact parts and so on.

The low molecular weight siloxanes adsorbed to electrical contact parts are converted into $SiO_2 \cdot nH_2O$ by undergoing oxidation, and further accumulated in the form of $\alpha SiO_2$ on the surface of the contact parts to cause a contact point disturbance. Therefore, the presence of low molecular weight siloxanes is already known to be undesirable.

In addition, it is also known that such a trouble can be prevented by reducing each of the contents of low molecular weight siloxanes having no more than 12 siloxane units to at most 50 ppm.

The removal of the foregoing low molecular weight siloxanes can be effected by subjecting an organopolysiloxane oil produced by the foregoing conventional method to a stripping treatment at a high temperature of 150–300° C. under a reduced pressure of 50 mmHg or below in an atmosphere of dried nitrogen gas, or by extracting the low molecular weight siloxanes contained in the foregoing organopolysiloxane oil with an alcohol or ketone solvent. Thus, each of the contents of low molecular weight siloxanes in the organopolysiloxane oil produced in the foregoing manner can be reduced to less than 50 ppm, and the total content of the low molecular weight siloxanes having from 2 to 12 siloxane units can be reduced to less than 500 ppm.

From the viewpoint of consistency and dispensation property required for a silicone grease composition, it is desirable that the liquid silicone used in the present invention have its viscosity in the range of 50 to 500,000 cs, particularly 100 to 100,000 cs, at 25° C.

When the liquid silicone as described above is used in a proportion less than 5 weight %, the resulting composition cannot be in a state of grease and has a poor spreadability; while, when the proportion thereof is more than 50 weight %, the composition obtained is insufficient in thermal conductivity. Accordingly, the suitable proportion of the liquid silicone in the present grease composition is from 5 to 50 weight %, preferably from 7 to 30 weight %.

In order to utilize liquid hydrocarbons or fluorinated hydrocarbon oils as the base oil of Component (B) in the present invention, they are required to have the following characteristics; namely 1) appropriate viscosity characteristics, including a slight change of viscosity with temperature and solidification at a low temperature (a low pour point),
2) low volatility at high temperatures and a high flash point,
3) high stability against oxidation and satisfactory thermal stability, more specifically good receptiveness to the benefit from antioxidants and no changes in color and properties upon heating up to about 200° C.,
4) good oiliness,
5) slight aggravating influences upon surrounding materials, such as sealing materials and resinous or ceramic cover, and
6) good affinity for fillers (thickeners).

As examples of a base oil which has the foregoing characteristics and is usable in the present invention, mention may be made of mineral oils generally used as the base oil of lubricating oil, particularly the mineral oils of naphthene and paraffin types. Besides the mineral oils, a wide variety of synthetic oils, setting aside the synthetic oils of silicone type such as methyl silicone oil and phenyl silicone oil, can be employed as the base oil of grease having the use under temperatures covering a wide range, provided that they have more excellent fluidity, viscosity index and thermal stability than mineral oils.

Specific examples of those mineral and synthetic oils usable as base oil in the present invention include paraffin oil, naphthene oil, α-olefin oligomers (poly-α-olefins), polybutenes (polyisobutylenes), substituted aromatic compounds, polyalkylene glycols (polyglycol, polyether, polyalkylene oxides), diesters (dibasic acid esters), polyol esters (neopentylpolyol esters and hindered esters), phosphoric acid esters (phosphate esters), fluorinated compounds, such as chlorofluorocarbons, fluoroesters and perfluoroalkyl ethers (fluoropolyglycols, perfluoropolyethers, polyperfluoroalkylethers), and polyphenylether.

With respect to the synthetic oils recited above, the α-olefin oligomers include those represented by the following formula (III), the polybutenes include those represented by the following formula (IV), the substituted aromatic compounds include those represented by the following formula (V) and the polyalkylene glycols include those represented by the following formula (VI):

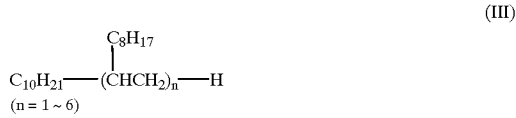

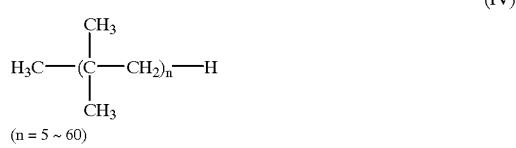

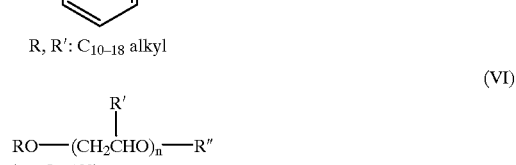

In the above formula (VI), R and R" each are a hydrogen atom or a $C_{1-20}$ alkyl group, R' is a hydrogen atom or a methyl group, and n is from 5 to 100. The compound of formula (VI) is generally polyethylene or polypropylene glycol ether having H or $CH_3$ as R and R". Further, it may be a copolymer of these two glycols.

The diesters (dibasic acid esters) are generally produced by the esterification reaction between alcohols and dibasic acids as shown below;

$$2ROH + HOOCR'COOH \rightarrow ROOCR'COOR + 2H_2O$$

wherein R is H or a $C_{4-18}$ alkyl group and R' is a $C_{4-18}$ alkylene group or an arylene group.

The dibasic acids used as starting material are generally those represented by formula, $HOOC(CH_2)_nCOOH$, with examples including adipic acid (n=4), azelaic acid (n=7), sebacic acid (n=8) and dodecane diacid (n=10). The alcohols used in combination with those acids are 7–13C primary alcohols having a side chain, with examples including 2-ethylhexanol ($C_8$), isodecanol ($C_{10}$) and tridecanol ($C_{13}$).

By using those acids and alcohols in different combinations, various diesters can be obtained. Examples thereof include diisodecyl phthalate, di-2-ethylhexyl phthalate, dibutyl phthalate, diisodecyl adipate, diisononyl adipate, diisobutyl adipate, mixed acid esters of 2-ethylhexanol, di-2-hexyl sebacate, dibutyl sebacate, di-2-ethylhexyl azelate, di-n-hexyl azelate, di-2-hexyl dodecanoate and dibutoxyethoxyethyl adipate.

The polyol esters, including neopentylpolyol esters and hindered esters, are monobasic fatty acid esters of polyhydric alcohols, such as neopentylpolyols.

In producing polyol esters, neopentylpolyols which are mass-produced as the starting material for syntheses of alkyd resin and surfactants can be employed as raw materials of alcohols. Specifically, neopentyl glycol (NPG), trimethylolpropane (TMP), trimethylolethane (TME), pentaerithritol (PE) and dipentaerithritol (DPE) can be used as polyhydric alcohol.

The monobasic fatty acids usable as the other starting material in the polyol ester synthesis include straight-chain and branched $C_{3-13}$ carboxylic acids. For instance, as $C_9$ carboxylic acids are exemplified the following acids having a straight-chain structure, a branched structure and a structure having a neopentyl type branch respectively:

CH₃(CH₂)₇COOH

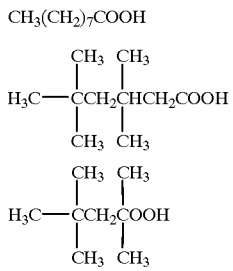

By variously combining the above-recited compounds as starting materials, a wide variety of polyol esters can be synthesized. In particular, the esters produced by the reaction of an acid having a neopentyl type branch with an alcohol having a neopentyl type branch have the advantage of high thermal stability.

Additionally, by the comparative experiment on stability against pyrolysis between di(isooctyl)azelate as an ester produced from an alcohol having no neopentyl type branch and an acid having no neopentyl type branch, bis(2,2-dimethyloctyl)azelate as an ester produced from an alcohol having a neopentyl type branch and an acid having no neopentyl type branch, and bis(2,2-dimethylpentyl)-2,2,8,8-tetraethylazelate as an ester produced from an alcohol having a neopentyl type branch and an acid having neopentyl type branches, it is known that the last ester as the neopentyl type-neopentyl type combination has the highest thermal stability.

The phosphoric acid esters include esters prepared from phosphoric acid as an inorganic acid and phenols or alcohols. With respect to the phenyl phosphate, as triphenyl phosphate is in a solid state at ordinary temperature, the phenyl phosphates in a liquid state can be generally prepared by using phenols substituted by alkyl group(s). Examples of such a liquid phenyl phosphate include tricresyl phosphate (TCP), trixylenyl phosphate, tripropylphenyl phosphate and tributylphenyl phosphate.

Suitable examples of an alkyl phosphate include tributyl phosphate (TBP) and tri-2-ethylhexyl phosphate (TOP).

The chlorofluorocarbons have a structure such that hydrogen atoms of n-paraffin are replaced by fluorine atoms and chlorine atoms, and can be produced by polymerizing chlorotrifluoroethylene in a low polymerization degree as shown in the following reaction scheme:

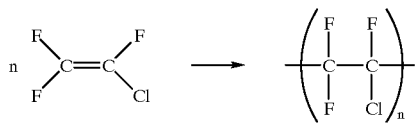

The chlorofluorocarbon produced has a viscosity depending on the polymerization degree, and the viscosity can be varied over a wide range.

Examples of a fluoroester usable in the present invention include sebacic acid esters of $C_7$ perfluoroalcohols, pyromellitic acid esters of perfluoroalcohols and camphoric acid esters of perfluoroalcohols.

The perfluoroalkyl ethers are generally represented by the following formula (VII) or (VIII):

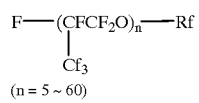

(VII)

(n = 5 ~ 60)

wherein Rf is $CF_3$ or $C_2F_5$, and n is a number of 5–60.

$$RfO—(CF_2CF_2O)_m—(CF_2O)_n—Rf \quad (VIII)$$

wherein Rf is $CF_3$ or $C_2F_5$, and m and n are the same or different, provided that m+n is a number of 5–60.

It is possible to produce perfluoroalkyl ethers having from low to high viscosities by changing the polymerization degree From the viewpoints of consistency and dispensation suitability required for thermally conductive grease, it is desirable that the liquid hydrocarbons and/or fluorinated hydrocarbon oil used in the present invention have their viscosity in the range of 50 to 500,000 cs, especially 100 to 100,000 cs, at 25° C.

Further, a thickener can be used as Component (C) in the present thermally conductive grease composition. As high thermal conductivity is required for the thickener as Component (C), at least one inorganic powder selected from the group consisting of zinc oxide, alumina, boron nitride and silicon carbide can be employed as Component (C). The surface of such an inorganic powder may be made hydrophobic by pretreatment with an organosilane, organosilazane, organopolysiloxane or organic fluorine-containing compound, if needed. When these thickeners are used in a proportion higher than 30 weight %, the grease composition obtained is insufficient in spreadability. Therefore, it is desirable that they be used in a proportion of 0–30 weight %, preferably 0–15 weight %. It can be used for conferring high thermal conductivity on the grease composition, it is the more advantageous to the composition to use a filler having higher thermal conductivity.

The zinc oxide usable as Component (C) in the present invention is a white zinc oxide powder having a hexagonal or wurtzite crystal structure, generally referred to as "Zinc White". Such a zinc oxide powder can be prepared using known methods. For instance, one of the known methods is an indirect method in which the zinc vapor generally produced by heating metallic zinc to 1,000° C. is oxidized with hot air, and another thereof is a direct method wherein the zinc oxide obtained by roasting zinc ore is reduced by coal or the like and the zinc vapor produced is oxidized with hot air, or wherein the slag obtained by the leaching of zinc ore with sulfuric acid is admixed with coke and then heated in an to electric furnace, and further the zinc vapor produced thereby is oxidized with hot air.

The zinc oxide produced using any of the foregoing methods is cooled by passing through an air condenser equipped with a blower, and fractionated according to the grain size. As still another production method of zinc oxide, there is known a wet method in which a zinc salt solution is admixed with an alkali carbonate solution to precipitate zinc hydroxycarbonate and the zinc hydroxycarbonate obtained is roasted. The thus obtained zinc oxide powders are defined in accordance with the Japanese Industrial Standards, JIS K1410 and K5102, or American standards, ASTM-D79. In the present invention, the zinc oxide powders produced by any of the aforementioned methods can be used alone, or a mixture of zinc oxide powders produced by different methods may be used.

In general the zinc oxide powder is used not only as a vulcanization accelerator for rubber but also in the fields of coating color, ceramics, enameled ware, glass, ferrite, cosmetics and medicines. Further, it is known to use a zinc oxide powder as a thermal conductivity providing filler in a thermally conductive grease [Japanese Tokkai Sho 51-55870, Sho 54-116055, Sho 55-45770, Sho 56-28264, Sho 61-157587, Hei 2-212556 (U.S. Pat. No. 5,221,339), Hei 3-162493 (U.S. Pat. No. 5,100,568) and Hei 4-202496].

The average grain size of a zinc oxide powder which can be used in the present invention is in a wide range of 0.2 to 5 $\mu$m. In the view of the dispersibility in a base oil as Component (B) and the relation to the aluminum nitride powder used in combination, it is desirable to use a zinc oxide powder having a grain size in the range of 0.3 to 4 $\mu$m, particularly 0.3 to 3 $\mu$m. By using the zinc oxide powder having such a grain size, the oil separation degree of the thermal conductive material obtained can be reduced to 0.01% or below. Further, it is desirable for the zinc oxide used to have Mohs' hardness of from 4 to 5.

The alumina powder usable as a thickener capable of providing thermal conductivity in the present invention is a powder of aluminum oxide represented by chemical formula, $Al_2O_3$, and includes aluminum oxide powders generally referred to as Alumina, α-Alumina, Single crystal corundum fines and Spherical Alumina respectively depending on their preparation methods.

In general the so-called Bayer method, wherein bauxite as a raw material is treated with hot sodium hydroxide, is employed as an industrial manufacturing method of alumina. In this method, crystals of aluminum hydroxide (Al(OH)$_3$) are once formed, and then burned at a high temperature, e.g., in a rotary kiln to be converted into alumina. Alumina has excellent thermal, mechanical and physical-and-chemical characteristics, so that it is widely used for various refractories, abrasives, porcelain, white filling pigments, catalysts and so on.

In general the alumina powder is an α-alumina powder having a crystal structure belonging to a hexagonal system, and it is a white powder in appearance. Such an α-alumina powder has an apparent average particle size of the order of 20–80 $\mu$m, and each particle is made up of primary crystalline alumina having a size of about 0.5 $\mu$m to about 20 $\mu$m. Also, the α-alumina powder can be produced in various grades depending on the intended use thereof. In the case where an α-alumina powder is used for a silicone grease, the shape and the size thereof have delicate effects on characteristics of the resulting grease, including homogeneity and consistency.

The alumina powder used in the present invention can have its apparent average particle size in a wide range of 20 to 80 $\mu$m, but from the viewpoint of dispersibility in a liquid silicone it is desirable that the apparent average particle size thereof be in the range of 30 to 50 $\mu$m, particularly 30 to 40 $\mu$m. As for the hardness of an alumina powder, the general alumina is very hard and the Mohs' hardness thereof is from 8 to 9. In the present invention, it is possible to use alumina powders having Mohs' hardness in such a range.

The thermal conductivity of alumina is $6.5 \times 10^{-2}$ cal/cm·sec·° C. (27.2 W/m° K.) in theory, but the measured thermal conductivity of an alumina powdery product is generally lower than the theoretical value because they are more or less contaminated with impurities and contain voids or/and bubbles.

In the present invention, it is desirable to use an alumina powder having a thermal conductivity of at least $1.2 \times 10^{-2}$ cal/cm·sec·° C. (5.0 W/m° K.) at room temperature. Even if the alumina powder having a thermal conductivity lower than $1.2 \times 10^{-2}$ cal/cm·sec·° C. is added to grease, it cannot satisfactorily contribute to thermal conductivity of the grease.

The boron nitride powders usable as a thickener of Component (C) in the present invention are boron nitride powders having a hexagonal crystal structure similar to that of graphite, or a hexagonal network laminate which are produced by heating boric acid or a borate in combination with a nitrogen-containing organic compound or ammonia. The boron nitride of hexagonal system has characteristics such that it retains high lubricity even in a high temperature range, has high thermal conductivity as well as high electrical insulating capacity, and further is chemically stable and hardly wetted with fused metal or glass. Accordingly, it is used as an electrical insulating filler having high thermal conductivity, a solid lubricant, a filler for modification of resins, or the like.

These boron nitride powders having a crystal structure of hexagonal system are white in appearance, the average grain size thereof is from 1 to 10 $\mu$m. Although the boron nitride powder used in the present invention may have its average grain size in the foregoing wide range of 1–10 $\mu$m, it is preferable that the average size be in the range of 1–5 $\mu$m from the viewpoints of dispersibility in a base oil as Component (B) and prevention of oil separation.

In addition, the hexagonal boron nitride powder is generally soft. In the present invention, the boron nitride powders having Mohs' hardness in the range of 1 to 3 are usable. In particular, the boron nitride powders having Mohs' hardness of the order of 2 are used to advantage.

The theoretical thermal conductivity of boron nitride is 60.3 W/m° K. at room temperature, but the measured thermal conductivity of a boron nitride powdery product is generally lower than the theoretical value because the product is more or less contaminated with impurities and contains voids or/and bubbles. In the present invention, it is desirable to use a boron nitride powder having a thermal conductivity of at least 5.0 W/m° K. at room temperature. Even if the boron nitride powder having a thermal conductivity lower than 5.0 W/m° K. is contained in grease, it cannot satisfactorily contribute to thermal conductivity of the grease.

On the other hand, the hexagonal boron nitride as described above is converted to cubic boron nitride based on the same structural principle of diamond when it undergoes a high temperature-ultrahigh pressure processing. The boron nitride having a crystal structure of cubic system has the hardness second to that of diamond, and its powdered products available on the market are from liver brown to black in appearance and the average particle size thereof is in the range of several $\mu$m to 800 $\mu$m.

Such cubic boron nitride powders also are usable in the present invention, but they are not favorable because their thermal conductivity is in a low range of 0.5 to 3.6 W/m° K.; as a result, even if they are added to grease, the achievement of high thermal conductivity aimed at by the present invention is difficult.

The silicon carbide powder usable as Component (C) in the present invention is generally obtained by producing high-purity α-SiC ingot from silica and coke as the main raw materials by means of an electric resistance furnace (Acheson furnace) and subjecting the thus produced ingot to pulverizing, decarburizing, iron-removing and sieving steps in succession. This process can provide silicon carbide powders having various particle size distributions depending on the intended uses. Further, an ultra fine silicon carbide powder can be prepared by choosing a powder having a moderate particle size distribution as starting material, thoroughly grinding the powder into fine particles of sub-micron order in size, sieving them, and further purifying by a chemical treatment.

The particle diameter and the particle size distribution of silicon carbide are determined by the methods defined in JIS R6001, JIS R6002 and JIS R6124. The average particle size of a silicon carbide powder used in the present invention, though it may be in the wide range of 0.4 to 10 μm, is desirably in the range of 0.4 to 5 μm from the viewpoints of securing high dispersibility in liquid silicone and preventing oil separation. The silicon carbide powders are bluish black in appearance, have a crystal structure of trigonal prism, and are generally hard. With respect to the hardness, silicon carbide powders are usable in the present invention so far as they have Mohs' hardness in the range of 8 to 9.

The theoretical thermal conductivity of silicon carbide is $2.4 \times 10^{-1}$ cal/cm·sec·° C. (100.4 W/m° C.) at room temperature, but the actually measured value is lower than the theoretical value because the silicon carbide powder obtained in practice is more or less contaminated with impurities and contains voids and bubbles. It is desirable for the silicon carbide powder used in the present invention to have a thermal conductivity of at least $1.2 \times 10^{-2}$ cal/cm·sec·° C. (5.0 w/m° K.) at room temperature. Even if the silicon carbide powder having a thermal conductivity lower than $1.2 \times 10^{-2}$ cal/cm·sec·° C. is added to grease, it cannot confer satisfactory thermal conductivity on the grease.

In preparing a thermal conductive silicone composition according to the present invention, at least Components (A) and (B) of the aforementioned Components are mixed with a mixing machine, e.g., TRIMIX, TWINMIX or PLANETARY MIXER (which are the trade names of mixers made by INOUE MFG., INC.), ULTRA MIXER (which is the trade name of a mixer made by MIZUHO INDUSTRIAL CO., LTD.) or HIVISDISPERMIX (which is the trade name of a mixer made by TOKUSHU KIKA KOGYO CO., LTD.). The mixing may be carried out under heating at 50–150° C., if needed. In order to make the thus prepared mixture homogeneous, it is desirable that the mixture be subjected to a kneading operation under high shearing stress. Examples of a kneader usable for this operation include a three-rod roll kneader, a colloid mill and a sand grinder. Of these kneaders, a three-rod roll kneader is used to advantage.

The present grease compositions thus prepared have considerable improvement in water resisting properties, and can steadily retain hardness (consistency) and thermal conductivity over a long period.

Now, the present invention will be illustrated in more detail by reference to the following examples, but these examples should not be construed as limiting the scope of the invention in any way.

The entire disclosure of all applications, patents and publications, cited above and below, and of corresponding Japanese applications No. Hei 10-230587, filed Aug. 17, 1998, and No. Hei 10-232074, filed Aug. 18, 1998, is hereby incorporated by reference.

PREPARATION EXAMPLES OF SURFACE-TREATED ALUMINUM NITRIDE POWDER

Moisture-proof Test

The moisture-proof effect of the present surface treatment on an aluminum nitride powder was evaluated as follows; After placing 5 g of an aluminum nitride powder and 95 g of water in a 250 ml plastic container with a stopper and putting the stopper in the container, the container is shaken for 24 hours at room temperature by means of a shaking machine. Then, the contents are filtered through a filter paper, and the pH of the filtrate is measured with a pH meter (Model F-15, made by Horiba Seisakusho Co., Ltd.). The moisture-proof effect is evaluated by the thus measured pH value.

PREPARATION EXAMPLE 1

In a 5-liter PLANETARY MIXER (trade name, a mixer made by INOUE MFG., INC.), 10 g of an organosilane of formula $C_{10}H_{21}Si(OCH_3)_3$ and 1,000 g of an aluminum nitride powder (amorphous, average particle size: 2.0 μm, specific surface area: 4.0 m²/g) were placed and mixed with stirring for 30 minutes at room temperature. The thus surface-treated aluminum nitride powder is referred to as Component (A-1) hereinafter. This powder was subjected to the aforementioned moisture-proof test, and the measured value of pH was 7.0.

PREPARATION EXAMPLES 2 TO 4

Surface-treated aluminum nitride powders were prepared in the same manner as in Preparation Example 1, except that the organosilane of formula $C_{10}H_{21}Si(OCH_3)_3$ was used in different amounts, respectively, as set forth in Table 1. These powders are referred to as Component (A-2), Component (A-3) and Component (A-4) respectively. They were also subjected to the aforementioned moisture-proof test, and results thereof are shown in Table 1.

PREPARATION EXAMPLES 5 TO 8

Surface-treated aluminum powders referred to as Components (A-5) to (A-8) respectively were prepared in the same manner as in Preparation Example 1, except that the organosilane of formula $C_{10}H_{21}Si(OCH_3)_3$ was replaced by organosilanes of formulae $C_{12}H_{25}Si(OCH_3)_3$, $C_6H_{13}Si(OCH_3)_3$, $C_{10}H_{21}Si(CH_3)(OCH_3)_2$ and $CH_3Si(OCH_3)_3$, respectively. They were also subjected to the aforementioned moisture-proof test, and results thereof are shown in Table 1.

TABLE 1

| Ingredient | Amounts of Ingredients used (g) | | | | | | | |
|---|---|---|---|---|---|---|---|---|
| Aluminum nitride powder | 1000 | 1000 | 1000 | 1000 | 1000 | 1000 | 1000 | 1000 |
| $C_{10}H_{21}Si(OCH_3)_3$ | 10 | 5 | 50 | 100 | 0 | 0 | 0 | 0 |
| $C_{12}H_{25}Si(OCH_3)_3$ | 0 | 0 | 0 | 0 | 10 | 0 | 0 | 0 |
| $C_6H_{13}Si(OCH_3)_3$ | 0 | 0 | 0 | 0 | 0 | 10 | 0 | 0 |
| $C_{10}H_{21}Si(CH_3)(OCH_3)_2$ | 0 | 0 | 0 | 0 | 0 | 0 | 10 | 0 |
| $CH_3Si(OCH_3)_3$ | 0 | 0 | 0 | 0 | 0 | 0 | 0 | 10 |
| Treated aluminum nitride powder | A-1 | A-2 | A-3 | A-4 | A-5 | A-6 | A-7 | A-8 |
| pH | 7.0 | 8.2 | 6.9 | 6.8 | 7.0 | 8.0 | 7.3 | 10.3 |

EXAMPLES 1 TO 11 AND COMPARATIVE EXAMPLES 1 TO 4

Thermally conductive grease composition samples were each prepared as follows: Three Components A, B and C as set forth in Tables 2 and 3 were weighed out in their respective amounts (parts by weight) as set forth in Tables 2 and 3, placed in a 5-liter PLANETARY MIXER (trade name, a mixer made by INOUE MFG., INC.), thoroughly mixed for 30 minutes at room temperature, and further subjected to a kneading process for three times by means of a three-rod roll.

The grease composition samples thus prepared were each examined for moisture-proof. Specifically, the moisture-proof evaluation was made by placing each sample in a thermo-hydrostat regulated at 40° C.–95% RH and measuring the consistency and thermal conductivity of each sample after 1-day storage, 7-day storage and 1-month storage respectively. Since the surface-treated aluminum nitride powder undergoes no ageing as long as it retains its moisture-proof, change in consistency and thermal conductivity of a grease composition was employed herein as a criterion for evaluating the deterioration in moisture-proof.

The consistency of each grease composition sample was measured in accordance with JIS-K-2220 and the thermal conductivity thereof was measured with a hot-wire instrument for measuring thermal conductivity, Model TCW-1000, made by Shinku Riko Co., Ltd. The results obtained are also shown in Tables 2 and 3.

Additionally, the symbols B-1, B-2, C-1 and C-2 used in Tables 2 and 3 stand for the following materials, respectively:

B-1

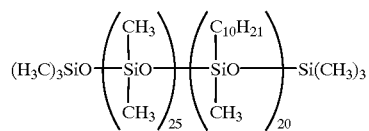

viscosity: 390 cs at 25° C.

B-2

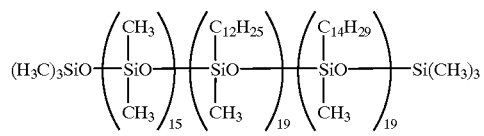

viscosity: 500 cs at 25° C.

C-1

Amorphous zinc oxide powder (average grain size: 0.2–5 μm)

C-2

Amorphous alumina powder (average grain size: 30–50 μm).

TABLE 2

| Component | Example 1 | 2 | 3 | 4 | 5 | 6 | 7 | 8 | 9 | 10 | 11 |
|---|---|---|---|---|---|---|---|---|---|---|---|
| Amount mixed (g) | | | | | | | | | | | |
| Component (A) | | | | | | | | | | | |
| A-1 | 800 | 0 | 0 | 0 | 0 | 0 | 0 | 700 | 700 | 0 | 0 |
| A-2 | 0 | 800 | 0 | 0 | 0 | 0 | 0 | 0 | 0 | 700 | 700 |
| A-3 | 0 | 0 | 800 | 0 | 0 | 0 | 0 | 0 | 0 | 0 | 0 |
| A-4 | 0 | 0 | 0 | 800 | 0 | 0 | 0 | 0 | 0 | 0 | 0 |
| A-5 | 0 | 0 | 0 | 0 | 800 | 0 | 0 | 0 | 0 | 0 | 0 |
| A-6 | 0 | 0 | 0 | 0 | 0 | 800 | 0 | 0 | 0 | 0 | 0 |
| A-7 | 0 | 0 | 0 | 0 | 0 | 0 | 800 | 0 | 0 | 0 | 0 |
| Component (B) | | | | | | | | | | | |
| B-1 | 200 | 200 | 200 | 200 | 200 | 200 | 200 | 150 | 0 | 150 | 0 |
| B-2 | 0 | 0 | 0 | 0 | 0 | 0 | 0 | 0 | 150 | 0 | 150 |
| Component (C) | | | | | | | | | | | |
| C-1 | 0 | 0 | 0 | 0 | 0 | 0 | 0 | 50 | 50 | 0 | 0 |
| C-2 | 0 | 0 | 0 | 0 | 0 | 0 | 0 | 0 | 0 | 50 | 50 |
| Consistency | | | | | | | | | | | |
| After 1-day storage | 290 | 267 | 320 | 340 | 315 | 305 | 288 | 295 | 287 | 299 | 310 |
| After 7-day storage | 292 | 272 | 324 | 340 | 309 | 299 | 283 | 299 | 285 | 305 | 306 |
| After 1-month storage | 288 | 274 | 315 | 345 | 308 | 298 | 287 | 302 | 293 | 206 | 306 |
| Thermal conductivity (W/m° K.) | | | | | | | | | | | |
| After 1-day storage | 2.8 | 2.7 | 2.8 | 2.8 | 2.9 | 2.6 | 2.6 | 2.8 | 2.7 | 2.6 | 2.8 |
| After 7-day storage | 2.7 | 2.7 | 2.8 | 2.8 | 2.8 | 2.6 | 2.6 | 2.7 | 2.7 | 2.6 | 2.7 |
| After 1-month storage | 2.6 | 2.6 | 2.8 | 2.7 | 2.8 | 2.5 | 2.6 | 2.6 | 2.6 | 2.5 | 2.7 |

TABLE 3

| Component | Comparative Example | | | |
|---|---|---|---|---|
| | 1 | 2 | 3 | 4 |
| Amount mixed (g) | | | | |
| Component (A) | | | | |
| A-1 | 450 | 980 | 0 | 0 |
| A-8 | 0 | 0 | 800 | 0 |
| Untreated AlN powder | 0 | 0 | 0 | 800 |
| Component (B) | | | | |
| B-1 | 500 | 20 | 200 | 200 |
| B-2 | 0 | 0 | 0 | 0 |
| Component (C) | | | | |
| C-1 | 50 | 0 | 0 | 0 |
| C-2 | 0 | 0 | 0 | 0 |
| Consistency | | | | |
| After 1-day storage | 400 | non-grease | 290 | 288 |
| After 7-day storage | 390 | | 245 | solidified |
| After 1-month storage | 390 | | solidified | solidified |
| Thermal conductivity (W/m° K.) | | | | |
| After 1-day storage | 0.9 | | 2.7 | 2.7 |
| After 7-day storage | 0.8 | | 2.1 | — |
| After 1-month storage | 0.8 | | — | — |

What is claimed is:

1. An aluminum nitride powder having the surface treated with an organosilane represented by formula, $R^I_a R^{II}_b SiY_{4-1-b}$, wherein $R^I$ represents a 6–20C alkyl group or a group formed by substituting halogen atom or atoms for part or all of the hydrogen atoms attached to carbon atoms of the 6–20C alkyl group, $R^{II}$ represents a 1–20C hydrocarbon group or a group formed by substituting halogen atom or atoms for part or all of the hydrogen atoms attached to carbon atoms of the 1–20C hydrocarbon group, Y represents a hydrolyzable group, a is an integer of 1 to 3 and b is an integer of 0 to 2, provided that a+b is an integer of 1 to 3.

2. An aluminum nitride powder according to claim 1, wherein the hydrolyzable group represented by Y is a group selected from the class consisting of a hydroxyl group, 1–6C alkoxy groups, acyloxy groups and alkenyloxy groups.

3. A thermally conductive grease composition comprising:
(A) 50–95 weight % of an aluminum nitride powder having the surface treated with an organosilane represented by formula, $R^I_a R^{II}_b SiY_{4-1-b}$, and/or a partial hydrolysis condensate thereof, wherein $R^I$ represents a 6–20C alkyl group or a group formed by substituting halogen atom or atoms for part or all of the hydrogen atoms attached to carbon atoms of the 6–20C alkyl group, $R^{II}$ represents a 1–20C hydrocarbon group or a group formed by substituting halogen atom or atoms for part or all of the hydrogen atoms attached to carbon atoms of the 1–20C hydrocarbon group, Y represents a hydrolyzable group, a is an integer of 1 to 3 and b is an integer of 0 to 2, provided that a+b is an integer of 1 to 3; and
(B) 5 to 50 weight % of at least one base oil selected from the group consisting of liquid silicones, liquid hydrocarbons and fluorohydrocarbon oils.

4. A thermally conductive grease composition according to claim 3, wherein the base oil is a liquid silicone selected from organopolysiloxanes represented by compositional formula $R^{III}_c SiO_{(4-c)/2}$, wherein each $R^{III}$ is a group selected from monovalent saturated or unsaturated, unsubstituted or substituted, hydrocarbon groups having 1 to 30 carbon atoms and c is a number of from 1.8 to 2.3, and having a viscosity of from 50 to 500,000 cs at 25° C.

5. A thermally conductive grease composition according to claim 4, wherein the monovalent hydrocarbon group as $R^{III}$ is a methyl group, a phenyl group or an alkyl group containing 6 to 14 carbon atoms and c is a number of from 1.9 to 2.1.

6. A thermally conductive grease composition according to claim 3, wherein the base oil is a liquid hydrocarbon or fluorohydrocarbon oil having a viscosity of from 50 to 500,000 cs at 25° C.

7. A thermally conductive grease composition according to claim 3, wherein the base oil is at least one liquid hydrocarbon selected from the group consisting of paraffin oil, naphthene oil, α-olefin oligomers, polybutenes, substituted aromatic compounds, polyalkylene glycols, diesters, polyol esters and phosphoric acid esters.

8. A thermally conductive grease composition according to claim 3, wherein the base oil is at least one fluorohydrocarbon oil selected from the group consisting of chlorofluorocarbons, fluoroesters and perfluoroalkyl ethers.

9. A thermally conductive grease composition according to claim 3, further comprising as Component (C) at least one thicknener selected from the group consisting of zinc oxide, alumina, boron nitride and silicon carbide powders in a proportion of no higher than 30 weight %.

10. An aluminum nitride powder, wherein the aluminum nitride powder prior to treatment has a Moh's hardness from 7 to 9 and a surface area from 0.1 to 100 m$^2$/g, having the surface treated with an organosilane represented by formula, $R^I_a R^{II}_b SiY_{4-1-b}$, and/or a partial hydrolysis condensate thereof, wherein $R^I$ represents a 6–20C alkyl group or a group formed by substituting halogen atom or atoms for part or all of the hydrogen atoms attached to carbon atoms of the 6–20C alkyl group, $R^{II}$ represents a 1–20C hydrocarbon group or a group formed by substituting halogen atom or atoms for part or all of the hydrogen atoms attached to carbon atoms of the 1–20C hydrocarbon group, Y represents a hydrolyzable group, a is an integer of 1 to 3 and b is an integer of 0 to 2, provided that a+b is an integer of 1 to 3 wherein the amount by weight of the organosilane is 0.1 to 30 parts per 100 parts of aluminum nitride.

11. A thermally conductive grease composition comprising the aluminum nitride powder having the surface treated with an organosilane of claim 10.

12. A thermally conductive grease composition according to claim 3, wherein the base oil is a liquid silicone selected from organopolysiloxanes represented by:

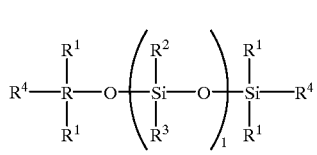

(I)

wherein $R^1$ is selected from group consisting of monovalent unsubstituted or substituted alkyls, alkenyls, and aryls having 1 to 30 carbon atoms; $R^2$ and $R^3$ are selected from the group consisting of the same monovalent hydrocarbon group as $R^1$ represents, an amino group-containing organic group, a polyether group-containing organic group or an epoxy group-containing organic group; $R^4$ is selected from the group consisting of a hydrogen atom, the same monovalent hydrocarbon group as $R^1$ represents, the same monovalent organic group as $R^2$ or $R^3$ represents, or a hydroxyl group; and l is a positive number.

13. A thermally conductive grease composition according to claim 3, wherein the base oil is a liquid silicone selected from organopolysiloxanes represented by:

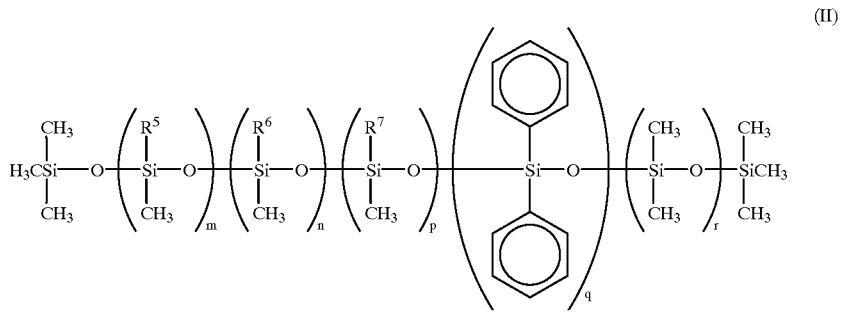
(II)

wherein $R^5$ is —$C_4H_9$, —$C_6H_{13}$, —$C_8H_{17}$, —$C_{10}H_{21}$, —$C_{12}H_{25}$, —$C_{15}H_{31}$ or —$C_{18}H_{37}$; $R^6$ is —$(CH_2)_s$—Q; s is an integer of 1 to 6; Q is a group selected from the following monovalent hydrocarbon groups having hindered phenol structures,

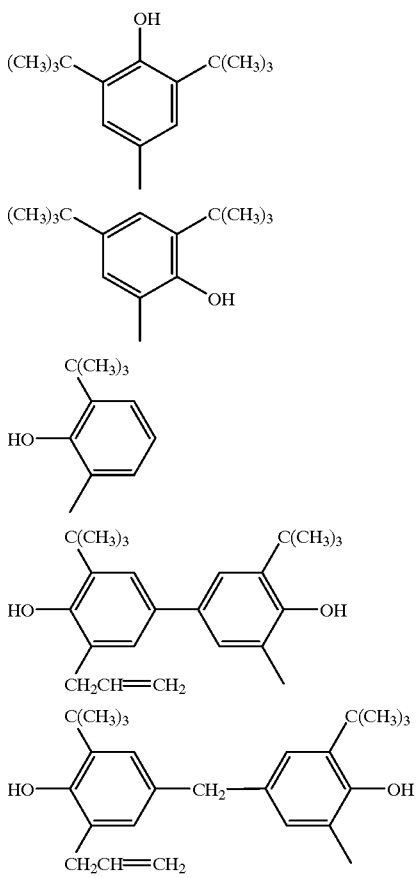

$R^7$ is a 2-phenylethyl group or a 2-phenylpropyl group; and m, n, p, q and r are each a member satisfying the following equations: $0 \leq m \leq 1{,}000$, $0 \leq n \leq 100$, $0 \leq p \leq 1{,}000$, $0 \leq q \leq 1{,}000$, $0 \leq r \leq 2{,}000$ and $5 \leq m+n+p+q+r \leq 2{,}000$.

14. A thermally conductive grease composition according to claim 7, wherein the α-olefin oligomers are selected from the oligomers represented by:

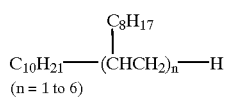
(n = 1 to 6)

the polybutenes are selected from the polybutenes represented by:

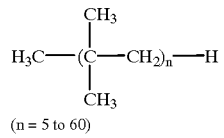
(n = 5 to 60)

and the substituted aromatic compounds are selected from the substituted aromatic compounds represented by:

R, R': $C_{10-18}$alkyl.

15. A thermally conductive grease composition according to claim 7, wherein the polyol esters are produced by the reaction of a an acid having a neopentyl type branch with an alcohol having a neopentyl type branch.

16. A thermally conductive grease composition according to claim 7, the polyalkylene glycols are selected from the polyalkylene glycols represented by:

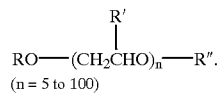
(n = 5 to 100)

17. A thermally conductive grease composition according to claim 7, wherein the perfluoroalkyl ethers are selected from the perfluoroalkyl ethers represented by:

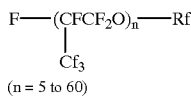
(n = 5 to 60)

wherein Rf is $CF_3$ or $C_2F_5$, and n is a number of 5–60; or selected from the perfluoroalkyl ethers represented by:

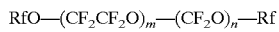

wherein Rf is $CF_3$ or $C_2F_5$, and m and n are the same or different, provided that m+n is a number between 5–60.

18. An aluminum nitride powder having the surface treated with an organosilane according to claim 1, wherein the aluminum nitride prior to treatment has a Moh's hardness from 7 to 9 and a surface area from 0.1 to 100 m²/g, and the amount by weight of the organosilane is 0.1 to 30 parts per 100 parts of aluminum nitride.

19. A thermally conductive grease composition according to claim 9 wherein the zinc oxide has an average grain size of 0.2 to 5 μm and the alumina has an apparent average particle size of 20 to 80 μm.

20. A thermally conductive grease composition according to claim 9 wherein the boron nitride has an average grain size of 1 to 10 μm and the silicon carbide has an average particle size of 0.4 to 10 μm.

* * * * *